(No Model.)
N. F. TIPTON.
EGG CARRIER.
No. 254,517. Patented Mar. 7, 1882.
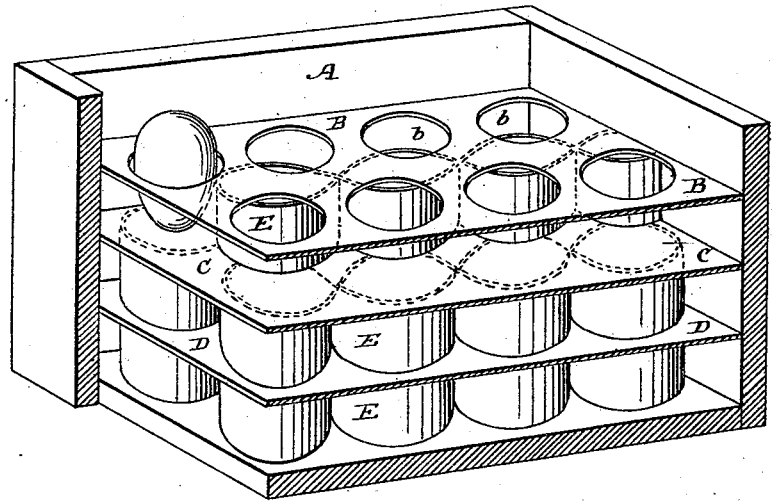
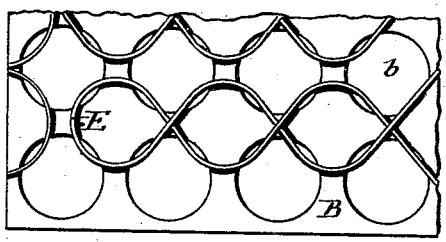
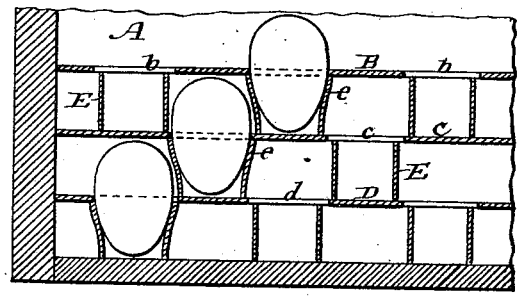
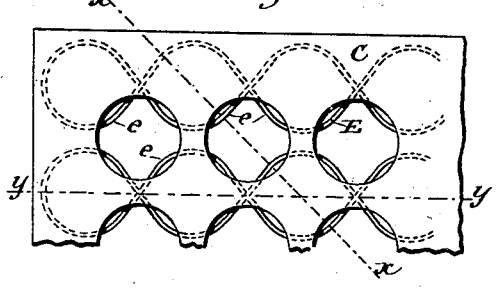
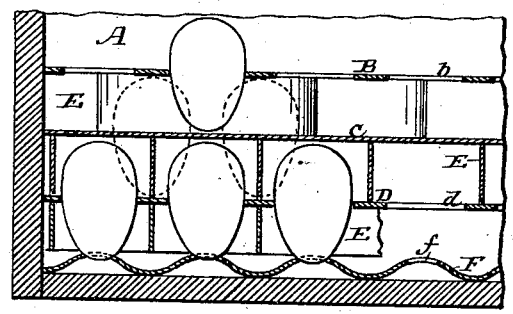
Witnesses:
W. B. Masson
C. C. Shepherd
Inventor:
Nelson F. Tipton
by E. E. Masson
atty

UNITED STATES PATENT OFFICE.

NELSON F. TIPTON, OF COLONY, KANSAS.

EGG-CARRIER.

SPECIFICATION forming part of Letters Patent No. 254,517, dated March 7, 1882. 

Application filed November 28, 1881. (No model.)

*To all whom it may concern:*

Be it known that I, NELSON F. TIPTON, a citizen of the United States, residing at Colony, in the county of Anderson and State of Kansas, have invented certain new and useful Improvements in Egg-Carriers, of which the following is a specification.

My invention relates to improvements in egg-carriers in which each egg is separated from the next by horizontal and vertical partitions; and the objects of my improvements are to support each egg at four or five points of its shell, and thus by multiplying the points of contact with its support prevent undue pressure at one point and consequently prevent the breakage of the eggs.

It consists also in making the support for the eggs of such form as to slightly yield under them and present -springy bearings for said eggs, and in the arrangement of the cells or springy inclosures to utilize the space adjoining the ends of the eggs, which is generally lost when square cells are used.

I attain these objects by the construction shown in the accompanying drawings, in which—

Figure 1 is a perspective view of a portion of a box containing three tiers of inclosures secured to as many perforated trays. Fig. 2 represents in plan a bottom view of the upper tray and egg-inclosures. Fig. 3 represents in plan a top view of the second tray. Fig. 4 is a vertical section of a portion of the inclosing-box, trays, and springy inclosures to receive the eggs, taken through a diagonal row of egg-cells, as on line $x\ x$ of Fig. 3. Fig. 5 is a vertical section taken through a row of egg-cells parallel with the side or end of the inclosing-box, as on line $y\ y$ of Fig. 3.

Heretofore some egg-carriers have been provided with square cells, cylindrical cells, and with cells nearly cylindrical, formed of strips of pasteboard provided with notches extending one-half their width and made to engage with other strips, notched similarly, but on the opposite side from the first. The cells of egg-carriers have been arranged in horizontal zigzag rows and in vertical zigzag rows, as well as in parallel rows, and paper-pulp egg-cells have been molded in sheets, each cell to receive either the one end only or one-half of an egg; but they all differ from mine in their construction and in the nature of the support presented for each egg.

My invention will first be described in connection with the drawings and then pointed out in the claims.

In said drawings, A represents the outer case or packing-box, which may be of any desired shape, and may also be surrounded by an air-chamber and an outer jacket, as described in another application for patent of even date with this.

B C D represent a series of pasteboard shelves provided with rows of perforations $b\ c\ d$, of such size as to receive the middle portion or largest diameter of an egg, and between these rows of perforations are glued, pasted, or otherwise secured by their edge only to the under side of the shelves some bent, notched, and interlocked strips of pasteboard, E, of such width as to cover one-half of the length of an egg or a little more. These pasteboard strips E are so bent and interlocked as to form inclosures capable of easily receiving an egg at the largest diameter thereof, and they are secured to the under side of the shelves B C so as to project some distance, (from an eighth to a quarter of an inch, or thereabout,) as shown at $e$, in the way of the perforations $b\ c$ made in the shelves; and said portion $e$ being left unattached to the shelves is free to be bent and yield under the pressure made in introducing eggs through the perforations $b\ c$, and supports by its resilience the egg placed therein. The wavy and interlocked strips E, being secured to the shelves on each side of the perforations, present four springy bearing-surfaces, $e$, of pasteboard, for each egg, and will retain it immovably with its point down, (as generally preferred,) whatever may be the size thereof. Although each egg is thus retained securely suspended, the portion of the shelf immediately under its point is kept unperforated, so that the egg cannot by any means come in contact with the one perpendicularly under it. The strips E, supporting the lowest shelf, D, may be placed between the rows of eggs and secured to said shelf, so as to overlap the perforations in said shelf, as shown in regard to shelves B and C, Figs. 2 and 3; or said strips may be made to coincide with and surround the under side of the perforations $d$, as shown in Figs. 1 and 5. In the latter case I first place upon the bottom of the box A a sheet of pasteboard, F, pressed so as to form a series of parallel waves having the top of each wave corresponding with each row of eggs, and the top of each wave has a series of perforations, $f$, (about three-quarters of an inch in diameter,) to give a broad bearing for the point of each egg.

The drawings show only three or four rows of shelves and cells; but it is intended to have a much larger number.

Having now fully described my invention, I claim—

1. The combination of shelves having rows of perforations adapted to receive an egg at the middle of its length with bent, notched, and interlocked strips E, secured to said shelves between the rows of perforations, so as to have a portion of their edge project in the way of said perforations, substantially as and for the purpose set forth.

2. The combination of shelves having rows of perforations adapted to receive an egg at the middle of its length with bent strips E, secured on edge to said shelves, and a sheet of pasteboard, F, provided with waves, and perforations $f$ in the top of each wave, substantially as and for the purpose described.

NELSON F. TIPTON.

Witnesses:
E. E. MASSON,
C. C. SHEPHERD.